United States Patent [19]

Cook

[11] Patent Number: 4,840,350
[45] Date of Patent: Jun. 20, 1989

[54] ELECTRICALLY ACTUATED EGR VALVE

[75] Inventor: John E. Cook, Chatham, Canada

[73] Assignee: Bendix Electronics Limited, Chatham, Canada

[21] Appl. No.: 80,041

[22] Filed: Jul. 31, 1987

[51] Int. Cl.⁴ .................. F16K 31/04; F16K 31/52
[52] U.S. Cl. .................. 251/129.11; 137/486.487.5; 251/129.12
[58] Field of Search .................. 251/129.11, 129.12, 251/59, 58, 86; 137/625.65, 486, 487.5

[56] References Cited

U.S. PATENT DOCUMENTS

| | | | |
|---|---|---|---|
| 2,735,047 | 2/1956 | Garner et al. | 251/86 X |
| 3,414,232 | 12/1968 | Hellman | 251/86 |
| 3,857,544 | 12/1974 | Rigby | 251/129.11 |
| 4,153,021 | 5/1979 | Hattori et al. | 251/129.12 |
| 4,190,081 | 2/1980 | Coles | 137/624.27 |
| 4,556,169 | 12/1985 | Zervos | 251/129.12 X |
| 4,573,494 | 3/1986 | Spurbeck | 251/129.11 X |

FOREIGN PATENT DOCUMENTS

| | | |
|---|---|---|
| 2044138 | 3/1972 | Fed. Rep. of Germany ............ 251/129.11 |
| 3606722 | 9/1987 | Fed. Rep. of Germany . |
| 0184376 | 10/1983 | Japan .................. 251/129.11 |
| 533267 | 3/1973 | Switzerland . |

*Primary Examiner*—Arnold Rosenthal
*Attorney, Agent, or Firm*—Russel C. Wells

[57] ABSTRACT

An electrically controlled EGR valve comprising: a valve stem (64), eccentrically positioned from an axis of rotation and movable in a substantially axial manner relative to a valve seat (84); a poppet valve (70) carried by the valve stem for closing the valve seat (84); a first shaft (52) eccentrically positioned relative to the axis of rotation and engagably connected to one end of the valve stem (64), and an electrically controlled actuator such as a torque motor (30) for rotating the first shaft (52) about the axis to cause the valve stem to move.

9 Claims, 1 Drawing Sheet

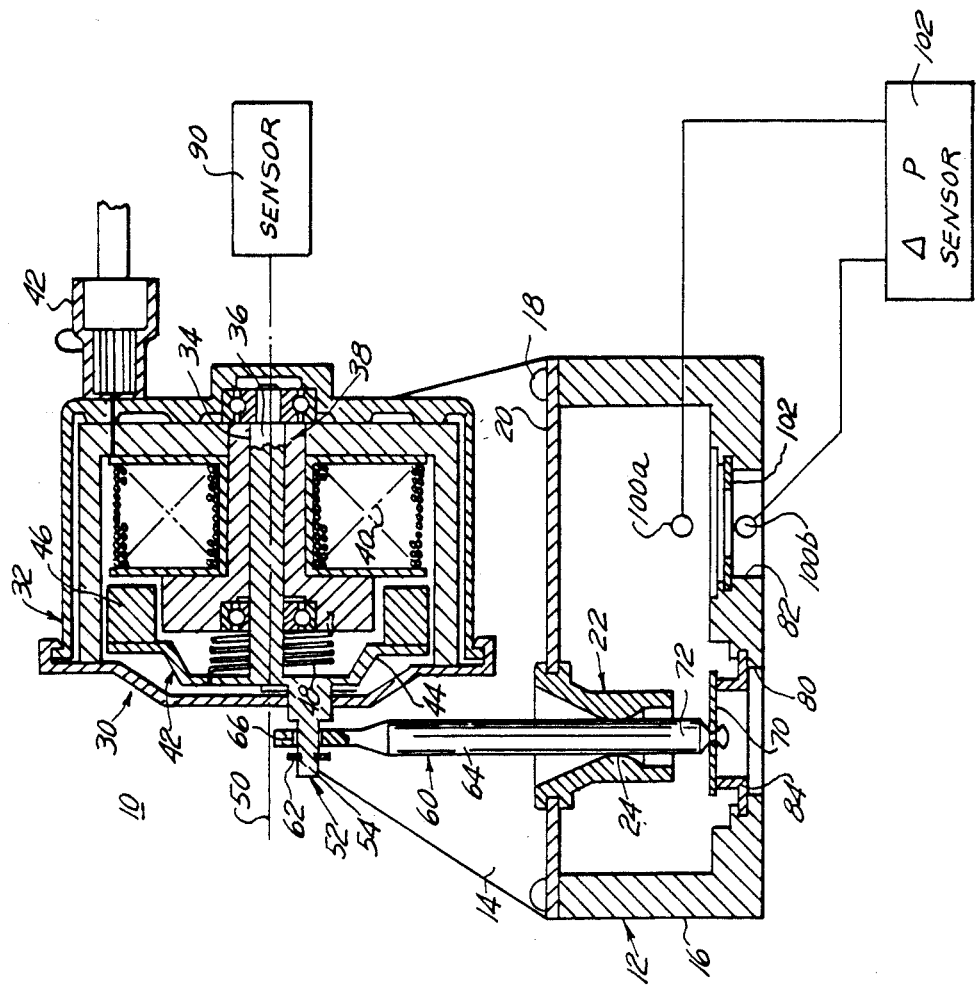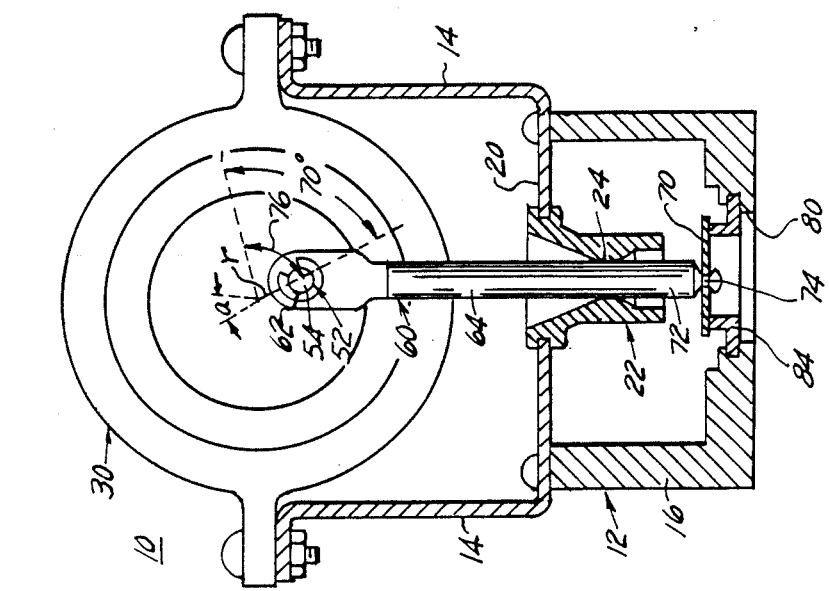

ELECTRICALLY ACTUATED EGR VALVE

BACKGROUND AND SUMMARY OF INVENTION

This invention relates generally to exhaust gas recirculation (EGR) valves and more specifically to such valves which are electrically actuated.

An exhaust gas recirculation valve is common place in the pollution control system of automotive engines. The EGR valve recirculates a predetermined amount of exhaust gas from the exhaust system to the intake manifold. Prior EGR valves relied upon vacuum motors for actuation. Such vacuum actuation provided for the continuous movement of an armature or closure member relative to a valve seat. A deficiency in the vacuum operated EGR valves is that sufficient vacuum force is not always available during needed periods of operation. Later versions of EGR valves contemplated replacing the vacuum motor with a variety of electrical actuators such as a stepper motor. A goal of electronically controlled EGR valves is to meet the continuous performance characteristics of the vacuum actuated valves. As such, a stepper motor having many poles is used to approximate the resolution of the vacuum activated EGR's, however, the increased number of poles increases the cost of the device. Another inherent shortcoming of the stepper motor or of a DC motor controlled EGR valve is in its failsafe mode of operation. It is desirable that upon electronic failure, the EGR valve should remain closed. This is difficult to achieve in the stepper or DC motor EGR valve since the position of the closure element is often established by a lead screw and nut which is driven by the motor and as such, the lead screw and nut may rest in an intermediate position at the time of failure of the motor. Another variety of electrically operated EGR valve is that type of valve which utilizes solenoids. To achieve adequate resolution can require using a plurality of such solenoids which increases the complexity and cost of the system. Typically the solenoid controlled EGR valve is constructed such that in the absence of an electrical signal a spring biases the closure member against a valve seat. As such, the closure element is maintained at its largest air gap. The solenoid can only provide the minimum available force when the closure member is against the valve seat and therefore it cannot precisely control the flow rate through the EGR valve when it is most crucially needed. Further, linear solenoids have a greater out of balance force resulting from a relatively heavy armature supported against a spring. Consequently, the linear armature is more difficult to control when subjected to high vibrational forces.

It is an object of the present invention to provide an EGR valve having high resolution at smaller valve openings than at larger valve openings. A further object of the present invention is to provide precise EGR control at low engine speeds. A further object of the present invention is to provide an EGR valve that is controllable in a position measurement and in a differential pressure mode of operation.

Accordingly, the invention comprises: a valve comprising:

a valve stem, eccentrically positioned from an axis of rotation and movable in a substantially axial manner relative to a valve seat; means carried by the valve stem for closing the valve seat; a first shaft eccentrically positioned relative to the axis of rotation and engagably connected to one end of the valve stem, and means for rotating the first shaft about the axis to cause the valve stem to move axially.

Many other objects and purposes of the invention will be clear from the following detailed description of the drawings.

BRIEF DESCRIPTION OF THE DRAWINGS

In the drawings:

FIG. 1 is a cross-sectional view of an EGR valve constructed in accordance with the teachings of the present invention.

FIG. 2 is a front-sectional view of the valve shown in FIG. 1.

DETAILED DESCRIPTION OF THE DRAWINGS

An electrically actuated EGR valve 10 is shown in FIGS. 1 and 2. The EGR valve 10 comprises a housing 12 having upper 14 and lower 16 members. The housing members 14 and 16 may be joined together by fasteners 18. The housing member 14 includes a cross member 20 positioned between housing members 14 and 16. A guide member 22 is supported by the cross member 20.

The guide 22 includes an inwardly directed lobe 24 which provides for a line contact about a valve stem 64 and permits the valve stem 64 to swivel relative to the lobe 24.

Attached to and supported by the upper housing member 14 is a torque motor 30. The torque motor 30 is exemplary of one of the rotary electronically controlled actuators which may be included within the present invention. Other types of rotary controllers include rotary solenoids and DC motors. Suffice it to say that the construction of a torque motor is well known in the art. The torque motor 30 illustrated in FIGS. 1 and 2 includes a housing 32 attached to the upper housing member 14. Rotatably supported relative to a bearing 34 or bushing (not shown) is a shaft 36. Positioned about the bearing 34 and shaft 36 is a stator assembly 38 which includes a coil 40. An electrical connector 42 is communicated in a known manner to the ends of the coil 40.

The shaft 36 comprises a portion of an armature assembly 42. The armature assembly 42 further includes a member 44 radially extending from the shaft 36 and a ferromagnetic element 46, supported by member 44, which reacts with a magnetic field generated by the coil 40 to rotate the shaft 36. Positioned about the shaft 36 and connected to both the stator assembly 38 and the member 44 is a bias spring 48. Radially offset from the axis 50 of the shaft 36 is another shaft or eccentric 52. The shaft 52 includes a narrowed portion 54. A valve stem assembly 60 is loosely secured to the shaft 52 by a retainer 62. The valve stem assembly 60 includes a valve stem 64 having an opening 66 in one end thereof. The valve stem 64 extends from and is moved by the shaft 52 and also extends through the guide 22. A free floating poppet valve 70 is attached to an end 72 of the valve stem 64. As illustrated in the FIGUREs, the poppet valve 70 is received about a necked-down portion 74 of the valve stem 64. The poppet valve 70 is loosely secured to the valve stem 64 to permit it to move relatively independently of the valve stem.

Reference is again made to the lower housing member 16 which additionally includes an inlet passage 80 and an outlet passage 82. Typically the inlet passage 80 is adapted to received exhaust gas while the outlet passage 82 is adapted to communicate the exhaust gas to the intake manifold of the engine. Positioned about the intake passage 80 is a valve seat 84 which is adapted to receive the poppet valve 70 such that when the poppet valve is seated upon the valve seat 84 the flow of exhaust gas from the inlet 80 to the outlet 82 is prohibited. Further it can also be seen from FIG. 1 that the center of the guide 22 is aligned with the center of the valve seat 84.

During periods when the coil 40 is not activated the spring 48 will bias the eccentrically positioned shaft 52 in a clockwise manner, as viewed in FIG. 2, such that the poppet valve 70 is seated upon the valve seat 84. Further from FIG. 2, it can be seen that in this closed positioned the axis of the eccentrically positioned shaft 52 is substantially perpendicular to the axis of the guide 22 and valve seat 84 while the axis 50 of the shaft 36 is offset therefrom. In the preferred embodiment of the invention the shaft 36 of the torque motor 30 is rotatable through an angle of approximately 70 degrees as measured from the closed position. The motion of the shafts 36 and 52 are illustrated by arrow 76. Consequently, because of the above geometry, the opening of the poppet valve 70 relative to the valve seat 40; especially at small openings, can be precisely controlled.

It is contemplated that the above described EGR valve 10 can be utilized in at least two modes of operation. The first mode of operation requires the addition of the rotary shaft sensor which is generally shown as 90. In practice the sensor 90 can easily be incorporated within the housing 32 of the torque motor 30. In this mode of operation the angular rotation of the torque motor shaft 36 is measured by the sensor 90. Based upon the knowledge of radial offset, r, and the initial angular offset, a, an electronic control unit responsive to the output of the sensor 90 can calculate the gap between the poppet valve 70 and its valve seat 84. Based upon this calculated gap the ECU, in concert with other engine parameters, can estimate in a known manner, the differential pressure drop across the valve seat and hence the amount of exhaust gas recirculation flow.

The above described EGR valve 10 may be used in a closed loop pressure mode of operation wherein pressure measurement ports 100a and 100b are positioned across the outlet passage 82. A differential pressure sensor 102 connected across the ports 100a and b can be used to calculate the EGR flow directly based upon the pressure drop across a sharp edge orifice 102.

In operation, the shaft 36 of the torque motor 30 is commanded, in response to engine parameters, to rotate a predetermined amount. This causes the valve stem 64 and poppet valve 70 to move away from the valve seat 84 thereby establishing a predetermined EGR flow. The eccentrically positioned shaft 52 converts the rotational motion of the torque motor 30 into substantially axial motion lifting the poppet valve 70 off from its seat 84. As can be seen from the above, the motion of the valve stem is not a pure axial motion but rather a combination of rotational and axial motion. When it is desired to terminate EGR flow the torque motor is reversed causing the poppet valve to again seat upon the valve seat 84. Since the poppet valve is not rigidly attached to the valve stem the poppet valve can pivot relative to the valve stem to permit proper engagement with the valve seat.

Many changes and modifications in the above described embodiment of the invention can, of course, be carried out without departing from the scope thereof. Accordingly, that scope is intended to be limited only by the scope of the appended claims.

I claim:

1. A valve comprising:
   a valve seat, positioned about a passage;
   a rigid valve stem that is movable in a substantially axial manner relative to the valve seat, from a first position corresponding to valve seat closure, to a second position corresponding to non-closure of the valve seat;
   closure means carried by the valve stem for seating upon the valve seat and for opening and closing the passage;
   an eccentric that can execute arcuate motion about an axis and comprises, in spaced relation to said axis, a pivotal connection to said stem;
   a valve stem guide that is spaced from said valve seat and from the pivotal connection of said eccentric to said stem;
   said valve stem guide comprising a convex wall defining a valve stem passage through which said valve stem extends and which is substantially coaxial with said first-mentioned passage, said convex wall providing a constraint on said valve stem passage as the stem is being axially displaced through the valve stem passage;
   said eccentric and said convex wall being organized and arranged in relation to said stem such that in response to arcuate motion of said eccentric about said axis from a first angular orientation, corresponding to said first position, to a second angular orientation, corresponding to said second position, the shaft is displaced substantially axially while pivoting with respect to both the eccentric and the valve stem passage, and for a given amount of motion of said eccentric about said axis from said first angular orientation, the closure means is moved relative to the valve seat a smaller distance than the closure means is moved relative to the valve seat for the same given amount of motion of said eccentric about said axis from said second angular orientation.

2. The valve as defined in claim 1 wherein said closure means includes a poppet valve rotatably supported upon the valve stem remote from said pivotal connection.

3. The valve as defined in claim 2 wherein the poppet valve is flat comprising an opening through which the valve stem extends.

4. The valve as defined in claim 2 including a spring acting upon the eccentric for causing the valve stem to be biased toward the valve seat.

5. The valve as defined in claim 1 wherein the actuator is a torque motor.

6. The valve as defined in claim 1 including means for measuring the amount of arcuate motion of the eccentric about said axis.

7. The valve as defined in claim 1 wherein the eccentric is positioned arcuately about said axis in response to a pressure differential indicative of flow through an outlet passage from the valve.

8. The valve as defined in claim 1 wherein the valve stem and the convex wall cooperate to provide a seal therebetween.

9. The valve seat as defined in claim 1 wherein the eccentric includes a first shaft coaxial to said axis and a second shaft parallel to but radially offset from said axis and wherein a spring is disposed about the first shaft to urge same in a direction to bias the valve stem toward the valve seat.

* * * * *